United States Patent

Kleinhenn

[15] 3,638,980
[45] Feb. 1, 1972

[54] SELF-RETAINED BOLT ASSEMBLY
[72] Inventor: Walter H. Kleinhenn, Flourtown, Pa.
[73] Assignee: Standard Pressed Steel Co., Jenkintown, Pa.
[22] Filed: Jan. 2, 1970
[21] Appl. No.: 270

[52] U.S. Cl. ...................287/189.36, 151/5, 151/7, 151/69
[51] Int. Cl. ...................F16b 5/02, F16b 39/04, F16b 39/34
[58] Field of Search .............151/7, 5, 6, 69; 287/189.36 F; 85/1 JP, 8.1, 5 CP, 8.8; 285/347, DIG. 19

[56] References Cited

UNITED STATES PATENTS

| | | | |
|---|---|---|---|
| 2,413,878 | 1/1947 | Maky | 285/55 |
| 2,898,081 | 8/1959 | Johnson | 85/8.8 X |
| 3,132,557 | 5/1964 | Bauer | 85/8.8 |
| 3,180,390 | 4/1965 | Ockert | 151/69 |
| 3,221,794 | 12/1965 | Acres | 151/69 |
| 3,478,802 | 11/1969 | Poccard | 151/69 X |
| 3,503,431 | 3/1970 | Villo et al. | 151/69 |

FOREIGN PATENTS OR APPLICATIONS

| | | | |
|---|---|---|---|
| 1,534,038 | 8/1968 | France | 85/1 JP |
| 946,624 | 1/1964 | Great Britain | 151/7 |
| 473,322 | 7/1969 | Switzerland | 151/6 |

Primary Examiner—Ramon S. Britts
Attorney—Andrew L. Ney

[57] ABSTRACT

A self-retained bolt assembly including a bolt having a circumferentially compressible plastic ring carried in a groove at or adjacent the thread runout. The ring compresses as the bolt is inserted into or withdrawn from a workpiece. With the bolt installed in an aperture in a workpiece, with the ring having been passed completely through the workpiece, the ring diameter is greater than the diameter of the aperture, thereby holding the bolt in the workpiece even in the absence of a nut turned onto the bolt.

6 Claims, 3 Drawing Figures

PATENTED FEB 1 1972 3,638,980
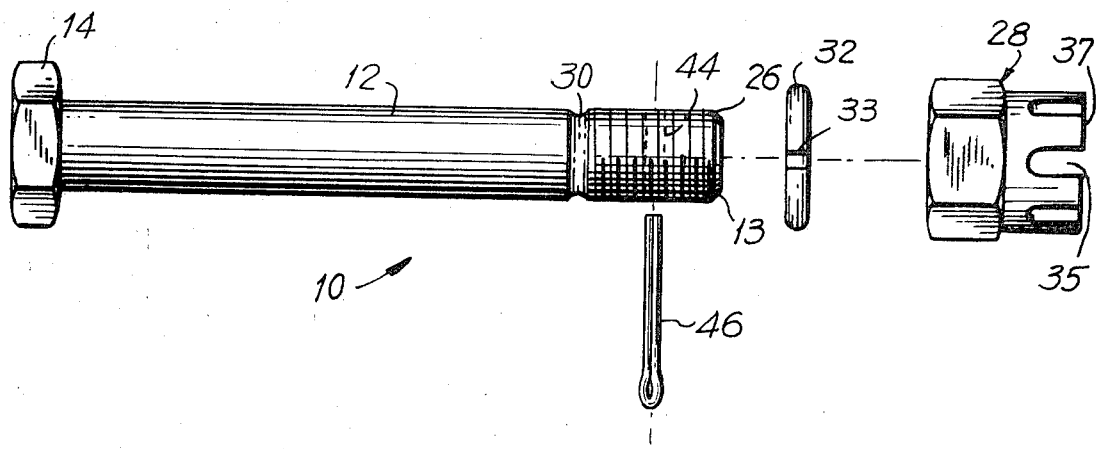
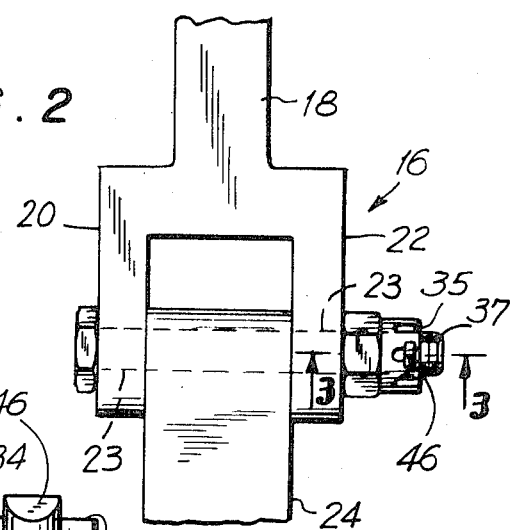
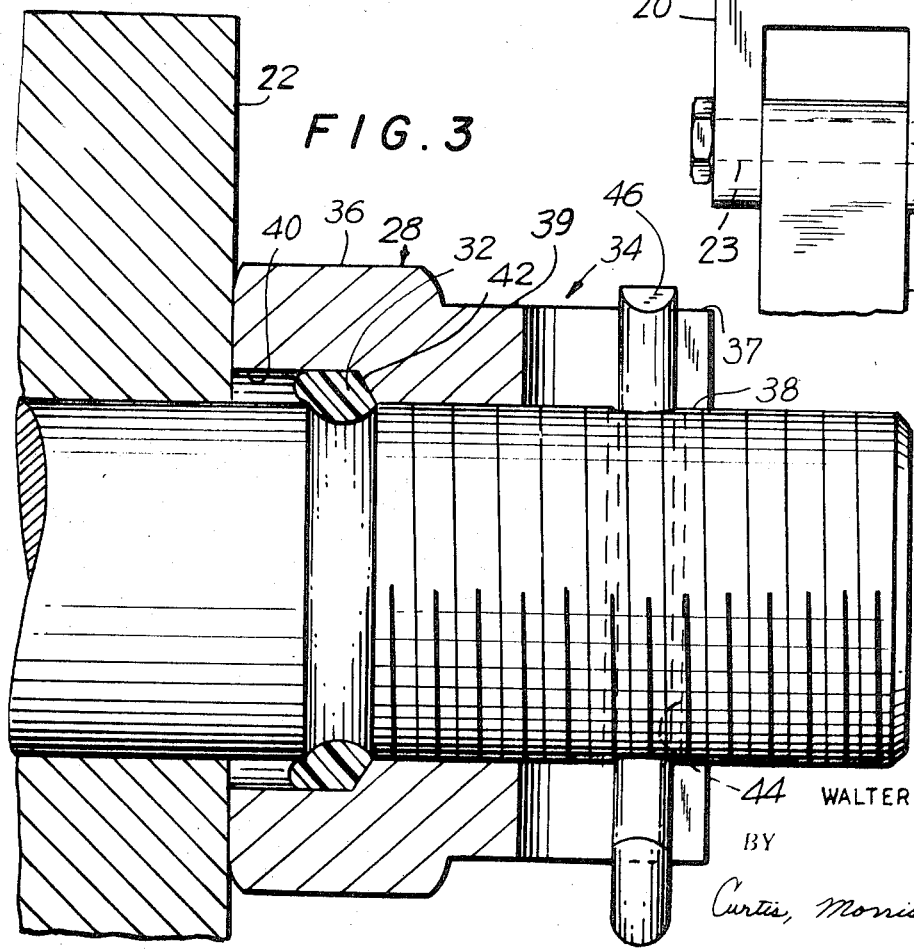
INVENTOR
WALTER H. KLEINHENN
BY
Curtis, Morris & Safford
ATTORNEYS

SELF-RETAINED BOLT ASSEMBLY

This invention relates to a bolt used in flexible linkages subject to severe vibrations and, in particular, to a self-retained bolt which protects against joint separation in the event a mating nut vibrates loose from the bolt.

In flexible linkages, such as pivot joints of the clevis type, linkages must be fastened together in a manner that will permit relative motion between the parts. Generally, a machine bolt is used to fasten the objects together; however, the bolt cannot be overtightened as overtightening will cause the bolt to act as a clamp and thus inhibit pivotal motion in the joint. When a sufficiently loose joint of this character is formed and then subjected to vibrations, there is a tendency for the nut to back off the threaded end of the bolt and thus destroy the integrity and utility of the joint. This is a particular problem in the aircraft industry as airplanes include numerous clevis-type joints which are subject to severe vibrations. Obviously, the integrity of pivoting linkages in airplane elements is vital.

One method of preventing nut back off in joints of this character involves the provision of a transverse bore in the threaded end of the bolt and the use of a castellated nut. A cotter pin is inserted in the bore of the bolt and is engaged in the grooves of the nut. This arrangement provides a sufficiently loose connection to permit pivotal movement in the joint and yet prevents back-off of the nut. It has been found, however, that under severe vibrations the cotter pins may have a tendency to loosen and fall out and, additionally, the pin may be inadvertently removed or improperly inserted whereby it falls out of the bore and thus the castellated nut would then be free to back off the bolt.

Various other attempts have been made to provide auxiliary retaining devices to protect against joint separation. Generally, these attempts have resulted in devices which fail to satisfy concurrently the requirements of reliability, reasonable cost, low weight, easy installation and removal, and reusability.

It is, thus, an object of the present invention to provide a new and improved self-retained bolt.

Another object of the invention is to provide a self-retained bolt having improved means for preventing joint separation.

It is a further object of the invention to provide a lightweight, self-retained bolt which is relatively easy and inexpensive to manufacture.

It is yet another object of the invention to provide a self-retained bolt which is easy to install and remove and is capable of reuse.

In accordance with a preferred embodiment of this invention, there is provided a self-retained bolt having a threaded end and a groove formed on the periphery of the bolt shank at or adjacent the thread runout. A compressible plastic ring is inserted in the groove. The ring is so arranged relative to the aperture of a workpiece into which the bolt is installed as to compress when the bolt is inserted into or removed from the workpiece. After passing completely through the workpiece, the ring resumes its initial size. Thus, the bolt is held in a workpiece even in the absence of a mating nut turned onto the bolt.

The construction of such a preferred embodiment as well as the advantages thereof, which include simplicity of design and economy of manufacture, and improved retaining characteristics, will become further apparent from the following specification when considered in conjunction with the accompanying drawing wherein:

FIG. 1 is an exploded view of the self-retained bolt of the present invention;

FIG. 2 is a plan view of the self-retained bolt used in a clevis-type joint; and FIG. 3 is an enlarged sectional view of the threaded end of the bolt taken on line 3—3 of FIG. 2.

With reference to the drawings, there is provided a self-retained bolt 10 having a smooth surfaced shank portion 12 and a head 14 which is shown illustratively with a hexagonal-shaped wrenching surface. The shank portion 12 provides a grip length for use in a clevis-type flexible joint 16, as illustrated in FIG. 2.

The clevis 18 includes legs 20 and 22 which define the grip length. The shank portion 12 of the bolt 10 extends through transverse bores 23 in the legs 20 and 22 of the clevis and acts as a pivot pin between clevis 18 and associated linkage 24 and, thus, shank portion 12 must have a length corresponding to the grip length of the clevis.

The free end 13 of the bolt 10 is provided with a threaded segment 26. A small groove 30 is formed on the periphery of the bolt at or adjacent the last thread on the threaded segment 26 and a circumferentially compressible nylon ring 32 is inserted in groove 30. Ring 32 has a slot 33 extending throughout its axial extent. This slot and the characteristics of the ring material provide for the desired compression of the ring. The maximum external diameter of the uncompressed ring 32 is greater than the diameter of bore 23 in leg 22, while the maximum external diameter of the compressed ring is no greater than the diameter of bore 23 in leg 22. The bore diameter of ring 32 and the depth of groove 30 are selected to permit the desired degree of compression of ring 32. In addition, the bore diameter of ring 32 is made smaller than the diameter of shank 12 and the major thread diameter of threaded segment 26 to captivate ring 32 in groove 30. It should be noted that for close-tolerance fits, the maximum external diameter of ring 32 reference to the bolt shank diameter, since in such applications the bolt shank diameter approximates the diameter of bore 23. The ring 32 may be a separately formed member which is slipped over the end of the bolt but, preferably, ring 32 is molded or stamped directly in groove 30 in one assembly operation.

With this arrangement, as the bolt is being installed in clevis joint 16, ring 32 is compressed to permit its passage completely through the joint. After the ring exits from the leg 22 on the far side of the joint, ring 32 expands to its uncompressed state to retain the bolt in the joint even in the absence of a nut turned onto the bolt. As the bolt is being removed from the joint, the ring is compressed so that it may pass completely through.

After the bolt has been inserted into the joint, a nut 28 is turned onto threaded segment 26. Nut 28, illustrated, as a castellated nut, includes a cylindrical castellated portion 34, cylindrical segment 39 and base portion 36 which has an exterior hexagonal-shaped wrenching surface. Castellated portion 34 includes longitudinal slots 35 and posts 37. The base portion 36 has a counterbore 40. The bore 38, extending through cylindrical segment 39 and castellated portion 34, is threaded to engage threaded segment 26 of the bolt. The diameter of counterbore 40 is slightly larger than the diameter of threaded bore 38. An inclined wall 42 serves to form a smooth transition from the threaded bore 38 to the counterbore 40.

A transverse bore 44 is provided in the threaded end 26 of the bolt 10 so that when the castellated nut 28 is threaded on the bolt, a cotter pin 46 may be inserted through selected slots 35 in castellated portion 34 and the bore 44 to effectively lock the nut in place. The combination of transverse bore 44, castellated nut 28, and cotter pin 46 provides yet another degree of protection against the joint failing. It should be noted that this added protection also may be achieved by a locknut and if such protection is unnecessary, a conventional unit may be employed.

The shape and dimensions of counterbore 40 of nut 28 may be selected to provide a number of different results. For example, the diameter of counterbore 40 may be greater than the maximum external diameter of the uncompressed ring 32. In this case, ring 32 is free to rotate about the longitudinal axis of the bolt even when the nut is on the bolt. While this may not be a problem under most conditions, under severe vibrations, a rotating retaining ring may mar the surface of the workpiece surrounding the hole if groove 30 is located in close proximity to the workpiece. To overcome such a problem, the diameter of counterbore 40 may be slightly smaller than the external diameter of the uncompressed ring so that the ring is compressed slightly when the nut is applied and frictional contact between the ring and the counterbore is developed to oppose rotation of the ring. In addition, this frictional contact will oppose the tendency of nut 28 to back off from the bolt.

To obtain an even greater degree of engagement between ring 32 and counterbore 40, the diameter of the counterbore can be reduced to a greater extent. By properly locating wall 42 in the counterbore, ring 32 may be wedged between wall 42 and the opposite wall of groove 30 as illustrated in FIG. 3. It will be understood that for this wedging action to be effective, the desired engagement must be developed before the ring is compressed to within the confines of groove 30. Thus, the width and location of the groove, the width of the ring and the length of the counterbore must be considered.

The use of a polyamide such as nylon for the ring 32 has been found to give satisfactory results since such a substance is noncorrosive and thus has a long effective life. In addition, the ring has a plastic memory and thus the bolt may be removed and reused without effecting the restraining capacity of the ring. Furthermore, such a material is soft enough and smooth enough to facilitate its passage through a workpiece causing little, if any, damage as, for example, the removal of a plating or coating. It is to be understood that other materials such as polyethylene, polypropylene or Teflon could also be used.

What is claimed is:

1. A self-retained bolt assembly including a bolt shank having a free threaded end portion, a circumferentially compressible ring of a synthetic resinous material carried in an annular groove in said shank at or adjacent the last thread on said end portion and a nut member having an axial bore including a first threaded section adapted to be threadably engaged with said threaded end portion and a second unthreaded section having a larger diameter than said first section, said nut member further including a castellated annular section defining a portion of said first threaded section and said threaded end of said shank including a transverse bore adapted to receive a cotter pin whereby said pin and castellated section of the nut cooperate to prevent rotation of the nut, said ring having a larger outside diameter than the diameter of said second unthreaded section and said second unthreaded section being adapted to surround and circumferentially compress said ring when said nut member is threaded on said threaded end portion of said bolt, whereby a frictional engagement is created between said nut and the ring which is operative to resist rotation of said nut.

2. A self-retained bolt assembly as defined in claim 1, wherein said ring is deformed by said second unthreaded section to substantially conform to the contours of said second unthreaded section and a portion of said ring is constrained between said second unthreaded section, the unthreaded portion of said shank and said groove to provide an enlarged frictional contact area between said ring and said nut whereby resistance to nut rotation is increased.

3. The self-retained bolt assembly as defined in claim 1 wherein said ring is made from a polyamide.

4. The self-retained bolt assembly as defined in claim 1 wherein said ring is made from a plastic selected from the group consisting of polyethylene, polypropylene and Teflon.

5. A joint comprising:
a plurality of workpieces having aligned apertures passing through said workpieces, a self-retained bolt installed in said aligned apertures including a bolt having a threaded shank and an enlarged head and a circumferentially compressible ring of a synthetic resinous material carried by said bolt in an annular groove positioned at or adjacent the thread runout, the bore diameter of the uncompressed ring being larger than the groove diameter but smaller than the major thread diameter, the maximum external diameter of the uncompressed ring being greater than the diameter of said aperture in said workpiece closest to said ring, the maximum external diameter of the circumferentially compressed ring is no greater than said diameter of said aperture in said workpiece closest to said ring, said ring having a slot throughout the axial extent thereof of sufficient width to provide for the circumferential compressibility, said bolt positioned so that the full shank length is in bearing and said ring is outside said aperture in said workpiece closest to said ring, a nut turned on to said self-retained bolt and holding said self-retained bolt in clamping engagement and said nut being counterbored at its bearing face to a diameter less than the maximum external diameter of said uncompressed ring.

6. A joint as defined in claim 5 wherein said nut has a castellated annular section, said bolt has a transverse bore extending through its threaded end, and a cotter pin extends through said transverse bore and said castellated annular section.

* * * * *